(12) United States Patent
Chen

(10) Patent No.: US 7,327,501 B2
(45) Date of Patent: Feb. 5, 2008

(54) METHOD FOR ACQUIRING DOCUMENT IMAGES WITH A PAPER FEED SCANNER

(75) Inventor: Michael Chen, Hsin-Chu (TW)

(73) Assignee: Avision Inc. (TW)

( * ) Notice: Subject to any disclaimer, the term of this patent is extended or adjusted under 35 U.S.C. 154(b) by 971 days.

(21) Appl. No.: 10/250,266

(22) Filed: Jun. 18, 2003

(65) Prior Publication Data
US 2003/0234964 A1 Dec. 25, 2003

(30) Foreign Application Priority Data
Jun. 20, 2002 (TW) .............................. 91113443 A (51) Int. Cl.
H04N 1/04 (2006.01)
(52) U.S. Cl. ................... 358/496; 358/486; 358/444; 358/488; 358/474
(58) Field of Classification Search ............... 358/496, 358/474, 505, 497, 498, 444, 404, 488, 486; 399/367, 370, 371
See application file for complete search history.

(56) References Cited

U.S. PATENT DOCUMENTS 5,602,650 A * 2/1997 Tamura et al. .............. 358/400
5,673,126 A * 9/1997 Ando ......................... 358/498
6,081,687 A * 6/2000 Munemori et al. ......... 399/374
6,301,019 B1 * 10/2001 Saito et al. ................. 358/461

FOREIGN PATENT DOCUMENTS

JP 2000295415 A * 10/2000

* cited by examiner

Primary Examiner—Cheukfan Lee (57) ABSTRACT

A method for acquiring document images with a paper feed scanner. The paper feed scanner includes a scanning module for scanning a document at a scanning position, a motor for driving the document, and a memory for storing image data. The method includes turning the motor to feed the document toward a scanning position; the scanning module starting scanning before the document reaches the scanning position; and detecting an edge of the document according to an image generated by the scanning module, and starting or stopping storing image data generated by the scanning module into the memory when detecting the edge of the document.

10 Claims, 6 Drawing Sheets

METHOD FOR ACQUIRING DOCUMENT IMAGES WITH A PAPER FEED SCANNER

BACKGROUND OF INVENTION

1. Field of the Invention

The present invention relates to a paper feed scanner, and more specifically, to a method of using a paper feed scanner to capture correct document images and ignore black areas surrounding the document images.

2. Description of the Prior Art

Paper feed scanners are popular for scanning large quantities of documents at one time. One main advantage that paper feed scanners have over flatbed scanners is that a stack of paper can be scanned all at once with little effort expended by a user.

In this specification, paper feed scanners include scanners which has automatic feeders for feeding documents page by page. Therefore flatbed scanners with automatic feeders are included in the "paper feed scanners" as described in the specification.

Figure 1:
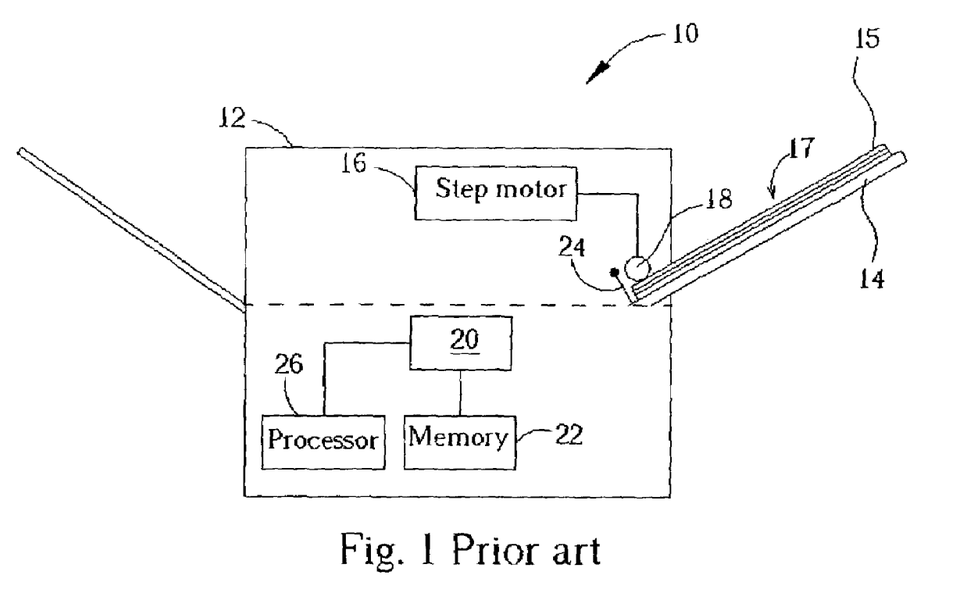
FIG. 1 is a paper feed scanner according to the prior art.

Please refer to FIG. 1. FIG. 1 is a paper feed scanner 10 according to the prior art. The paper feed scanner 10 comprises a housing 12, a paper tray 14, a step motor 16, a roller 18, a processor 26 and a scanning module 20. The paper tray 14 is connected to the housing 12 for holding a stack of documents 17. The step motor 16 is installed inside the housing 12 for driving the roller 18 so as to feed the documents 15 into the scanner 10. The processor 26 is used to control operations of the scanner 10. The scanning module 20 is installed inside the scanner 10 for scanning the documents 15 so as to generate document images. The scanner 10 has a scanning position positioned above the scanning module 20. When a document 15, one of the document stack 17, driven by the roller 18 reaches the scanning position, the scanning module 20 will start to scan the document 15, and the generated document image will be stored into a memory 22 of the scanner 10.

The scanner 10 further comprises a light sensor 24 for detecting the document 15. The distance between the light sensor 24 and the scanning position is a fixed value. The fixed value is converted to the corresponding number of steps rotated by the step motor 16 to deliver the document 15 from the light sensor 24 to the scanning position. This number of steps is recorded in the memory 22. When a front edge of the document 15 is detected by the light sensor 24, the step motor 16 will turn the predetermined number of steps before the scanning module 20 begins to scan. Similarly, when a rear edge of the document 15 is detected by the light sensor 24, the step motor 16 will turn the predetermined number of steps before the scanning module 20 stops to scan because the document 15 should have completely left the scanning position Unfortunately, if the light sensor 24 is not accurately installed inside the scanner 10, an error will exist in the distance between the light sensor 24 and the scanning position. However, the number of steps recorded in the memory 22 is predetermined, it does not change with the error. Thus, documents 15 fed into the scanner 10 will not be properly scanned because the documents 15 may be moved too far or too little by the step motor 16 before the scanning module 20 begins scanning the documents 15.

Figure 2:
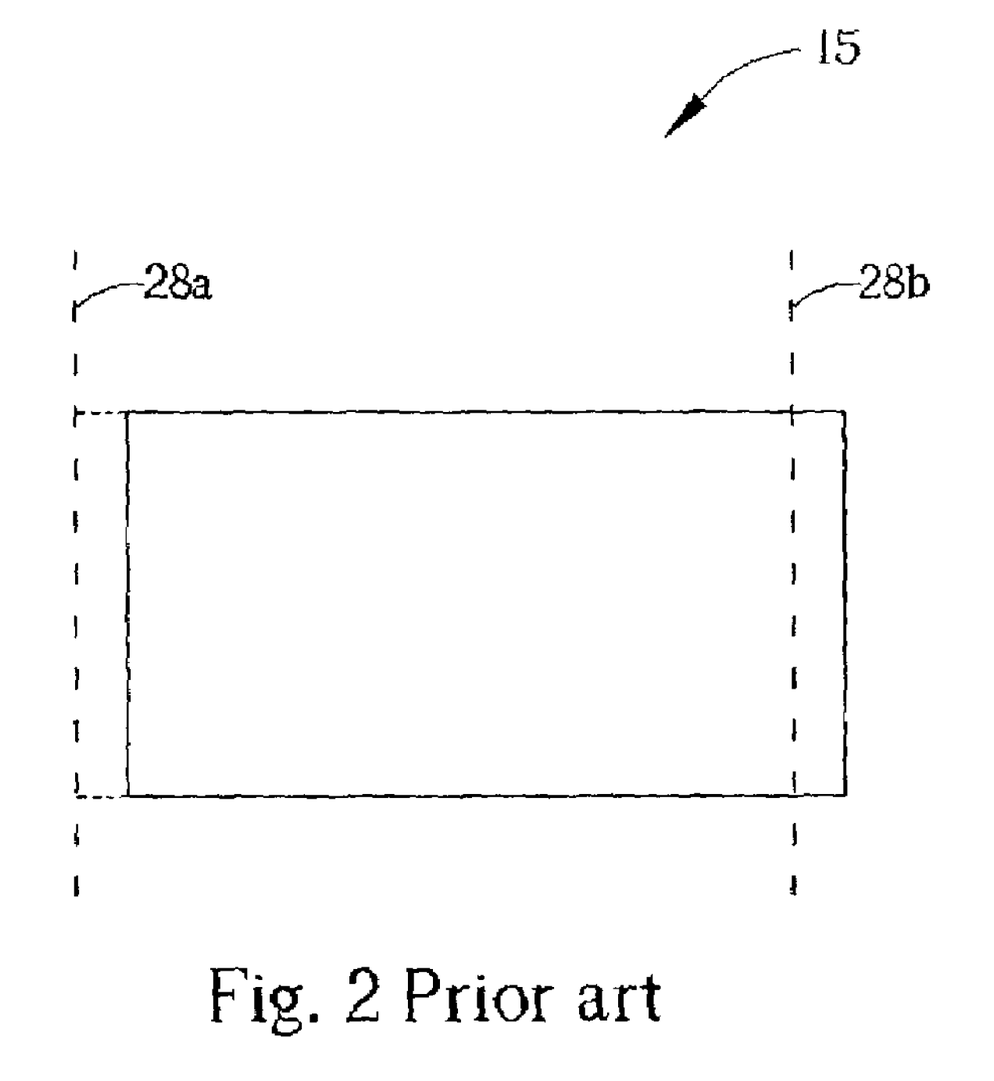
FIG. 2 illustrates a prior art scanning process in which the scanning module in FIG. 1 starts scanning a document too early.
Figure 3:
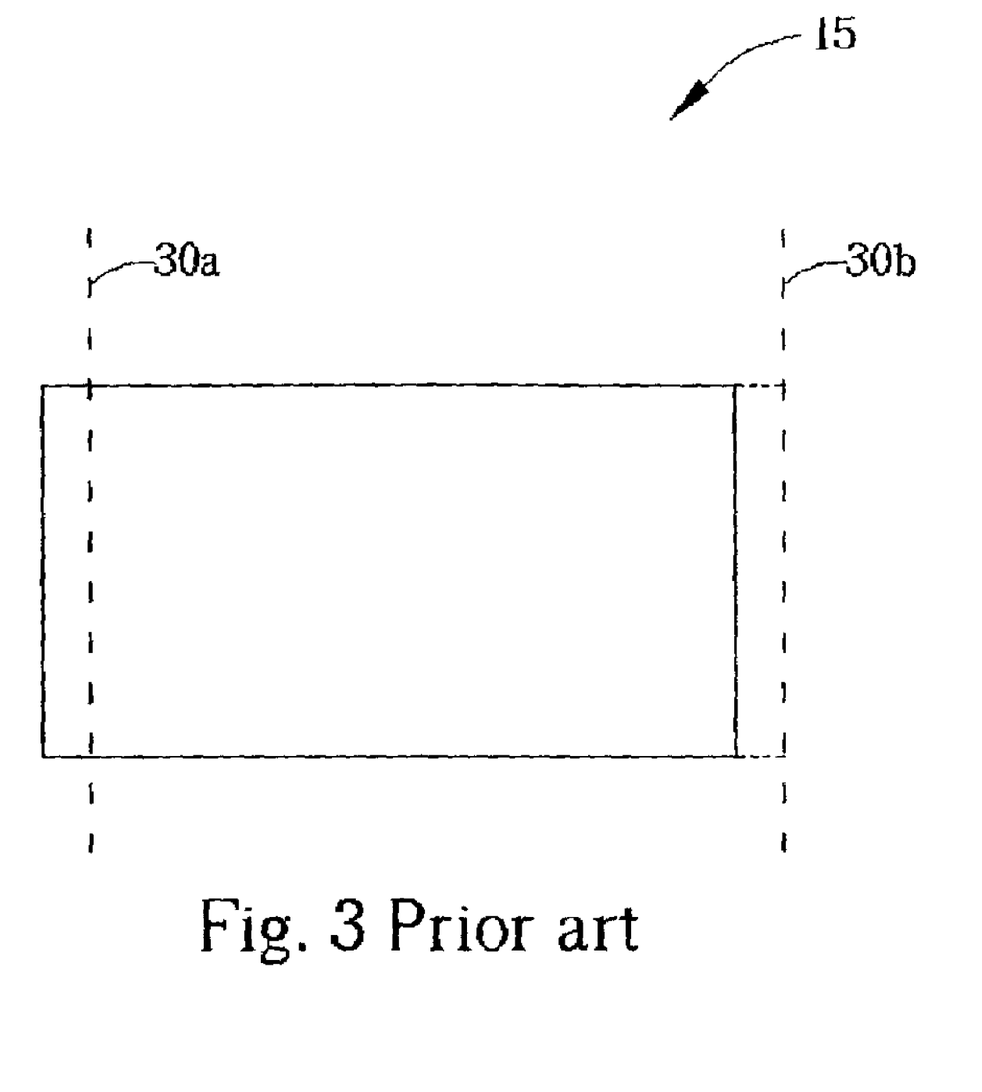
FIG. 3 illustrates a prior art scanning process in which the scanning module in FIG. 1 starts scanning a document too late.

For an illustration of this problem, please refer to FIG. 2 and FIG. 3. FIG. 2 illustrates a prior art scanning process in which the scanning module 20 starts scanning a document 15 too early. FIG. 3 illustrates a prior art scanning process in which the scanning module 20 starts scanning a document 15 too late.

In FIG. 2, the position error of the light sensor 24 lengthens the distance between the light sensor 24 and the scanning position. Before the front edge of the document 15 is dragged to the scanning position, the scanning module 20 begins scanning at line 28a. Because even though the document 15 has not reached the scanning position, the step motor 16 has rotated the predetermined number of steps. The scanning module 20 thus erroneously assumes the document 15 has reached the scanning position. Because the scanning module 20 starts to scan the document 15 too early, the scanning module 20 will scan a background section first, and then followed by a portion of the document 15. If the background color is black, then the scanning module 20 will acquire a document image containing a black area and part of the document 15. When the light sensor 24 detects a rear edge of the document 15, the scanning module 20 stops scanning the document 15 after the step motor 16 rotates the predetermined number of steps. This will cause the scanning module 20 stops scanning the document 15 at line 28b. That is, scanning is stopped before the rear edge of the document 15 is completely moved across the scanning position because the scanning module 20 erroneously determines the rear edge of the document 15 has reached the scanning position. Therefore, the acquired document image fails to contain a complete image of the document 15.

On the other hand, in FIG. 3, the position error of the light sensor 24 shortens the distance between the light sensor 24 and the scanning position. Therefore, after the front edge of the document 15 has already been dragged across the scanning position, the scanning module 20 begins scanning at line 30a. The document 15 is then moved completely across the scanning module 20, and the scanning module 20 stops scanning at line 30b. Therefore, a document image is acquired that contains part of the document 15 and a black area. And a very beginning portion of the document 15 was not scanned.

When installing the light sensor 24 into the scanner 10, the position error of the light sensor 24 is inevitable. As precision requirements become more and more strict, the error can no longer be tolerated. Although microswitches have been used to replace the light sensor 24, they cannot overcome the problems because they require very similar installation processes.

SUMMARY OF INVENTION

It is therefore a primary objective of the claimed invention to provide a method for acquiring document images with a paper feed scanner in order to solve the above-mentioned problems.

According to the claimed invention, a method for acquiring document images with a paper feed scanner is disclosed. The paper feed scanner includes a scanning module for scanning a document at a scanning position, a motor for driving the document, and a memory for storing image data. The method includes turning the motor to feed the document toward a scanning position; the scanning module starting scanning before the document reaches the scanning position; and detecting an edge of the document according to an image generated by the scanning module, and starting or stopping storing image data generated by the scanning module into the memory when detecting the edge of the document.

It is an advantage of the claimed invention that the method is able to capture an image of the entire document being scanned. Moreover, any blank areas that are generated in the document image are removed, leaving only an image of the original document being scanned.

These and other objectives of the claimed invention will no doubt become obvious to those of ordinary skill in the art after reading the following detailed description of the preferred embodiment, which is illustrated in the various figures and drawings.

DETAILED DESCRIPTION

The present invention provides a method of acquiring document images with a paper feed scanner. In this method, a scanning module starts scanning before a document reaches a scanning position, and the scanning module continues scanning after the document has left the scanning position. The method uses image processing means to detect blank areas on edges of the document image and remove the detected blank areas from the document image. Details of the method are described below.

Figure 4:
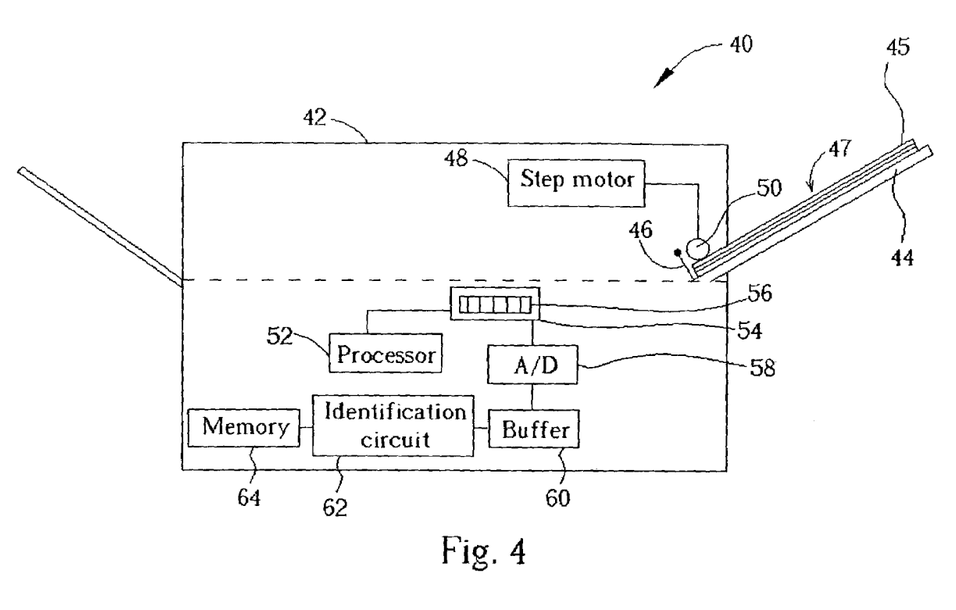
FIG. 4 is a diagram of a paper feed scanner according to the present invention.

Please refer to FIG. 4. FIG. 4 is a diagram of a paper feed scanner 40 according to the present invention. The paper feed scanner 40 comprises a housing 42, a paper tray 44, a paper detector 46, a step motor 48, a roller 50, a processor 52 and a scanning module 54. The paper tray 44 is connected to the housing 42 for placing a stack of documents 47. The paper detector 46 is installed at a front end of a stack of documents 47 for detecting a document 45 which is going to be scanned. It can be a microswitch or a light sensor. The step motor 48 is installed inside the housing 42 for driving the roller 50 so as to deliver the documents 45 into the scanner 40. The processor 52 is used to control operations of the scanner 40. The scanning module 54 is installed inside the scanner 40 for scanning the stack of documents 47 so as to generate document images. The scanning module 54 starts to scan the document 45 before the roller 50 drives the document 45 to a scanning position located above the scanning module 54.

The scanning module 54 comprises a plurality of photo sensors 56 arranged as a linear array. When the scanning module 54 scans a line of each of the documents 47, the light received by the photo sensors 56 is used for further identification. The scanner 40 further comprises an A/D converter 58, a buffer 60, an identification circuit 62 and a memory 64. The A/D converter 58 is connected to the plurality of photo sensors 56 for converting analog signals transferred from the photo sensors 56 into digital signals. The buffer 60 is connected to the A/D converter 58 for storing digital signals transferred from the A/D converter 58. The identification circuit 62 is connected to the buffer 60. The identification circuit 62 compares an average of digital signals transmitted from the buffer 60 with a threshold to determine if the digital signals stored in the buffer 60 should be stored into the memory 64.

When the scanner 40 receives a scanning instruction, the scanner 40 will instruct the step motor 48 to rotate the roller 50 so as to drive the document 45 forward. When the document 45 moves forward and triggers the paper detector 46, the processor 52 will initiate the scanning module 54 to start scanning after the step motor 48 rotates another predetermined number of extra steps. This predetermined number of extra steps is not sufficient to drive the document 45 to the scanning position. Therefore, the processor 52 initiates the scanning module 54 to start scanning before the document 45 reaches the scanning position. Further, the predetermined number of extra steps can be 0. In this case, the processor 52 initiates the scanning module 54 to start scanning as soon as the document 45 triggers the paper detector 46. When the scanning module 54 starts scanning, the photo sensors 56 of the scanning module 54 will detect intensities of the received light, and transfer the intensities to the A/D converter 58. Then the A/D converter 58 will convert the intensities into digital signals and transfer the digital signals to the buffer 60. The buffer 60 will pass the digital signals to the identification circuit 62. The identification circuit 62 will calculate the average of the digital signals and compares the average with a threshold stored in the identification circuit 62.

In this embodiment, it is assumed that the area scanned by the scanning module 54 is black when no document is present at the scanning position. Therefore, the light intensities detected by the photo sensors 56 will be very low. However, the light intensities detected by the photo sensors 56 will be very high when the scanning module 54 scans a blank document. Accordingly a threshold can be defined such that when the average of the light intensities is lower than the threshold, the scanning module 54 is scanning areas outside the document 45. And when the average of the light intensities is higher than the threshold, the scanning module 54 is scanning the document 45.

The processor 52 initiates the scanning module 54 to start scanning before a front edge of the document 45 reaches the scanning position, thus the photo sensors 56 of the scanning module 54 only detects minimal amount of light initially. This will cause the identification circuit 62 to determine that the average of the light intensities is lower than the threshold, and the identification circuit 62 will determine that the image is collected from areas outside of the document 45. Thus the image stored in the buffer 60 will not be transferred to the memory 64. The process repeats until the average of the light intensities is greater than the threshold. Until this time the identification circuit 62 will determine that the scanning module 54 is scanning the front edge of the document 45, and the buffer 60 will start to store the image collected from the document 45 into the memory 64.

After a rear edge of the document 45 passes the paper detector 46 thus no longer triggers the paper detector 46, and the step motor 48 rotates another number of extra steps, the processor 52 will start to determine when to stop the buffer 60 from transferring data to the memory 64. The process repeats until the average of the light intensities detected by the photo sensors 56 drops below the threshold again. At this time, the identification circuit 62 will determine that the scanning module 54 has scanned the rear portion of the document 45. The buffer 60 will not transfer the data stored therein to the memory 64. And the processor 52 will stop the scanning module 54 from performing further scanning. In this way, the images contained in the document 45 are fully stored into the memory 64. And no image outside the document 45 will be stored into the memory 64.

Figure 5:
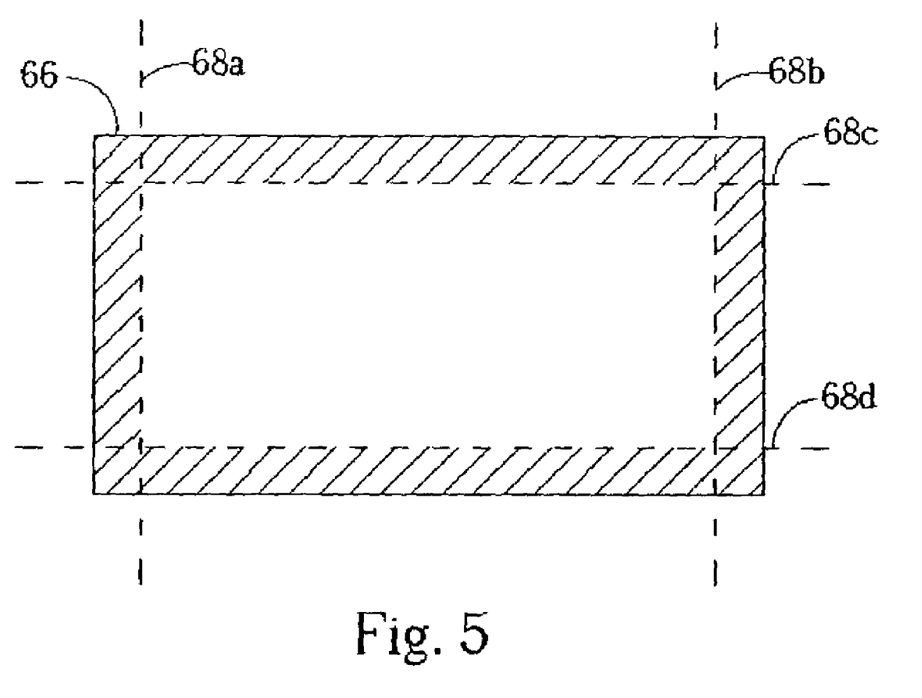
FIG. 5 compares the size of an area actually scanned by the scanning module with the size of an image stored in the memory.

Please refer to FIG. 5. FIG. 5 compares the size of an area actually scanned by the scanning module 54 with the size of an image stored in the memory 64. The area within a frame 66 corresponds to the area actually scanned by the scanning module 54. The area bounded by dotted lines 68a, 68b, 68c, 68d corresponds to the size of an image stored in the memory 64. And the image stored in the memory 64 corresponds to the image of the document 45. Because the area before the front edge of the document 45 (the area at the left side of the dotted line 68a) and the area after the rear edge of the document 45 (the area at the right side of the dotted line 68b) do not belong to the document 45, the scanner 40 has removed these areas by not storing images of these areas to the memory 64. On the other hand, the areas above the dotted line 68c and below the dotted line 68d are removed after the scanning module 54 completes the scanning process. Thus, the image stored in the memory 64 is consistent with the image of the document 45. Every portion of the document 45 will be scanned, and portions outside of the document 45 will be neglected.

Figure 6:
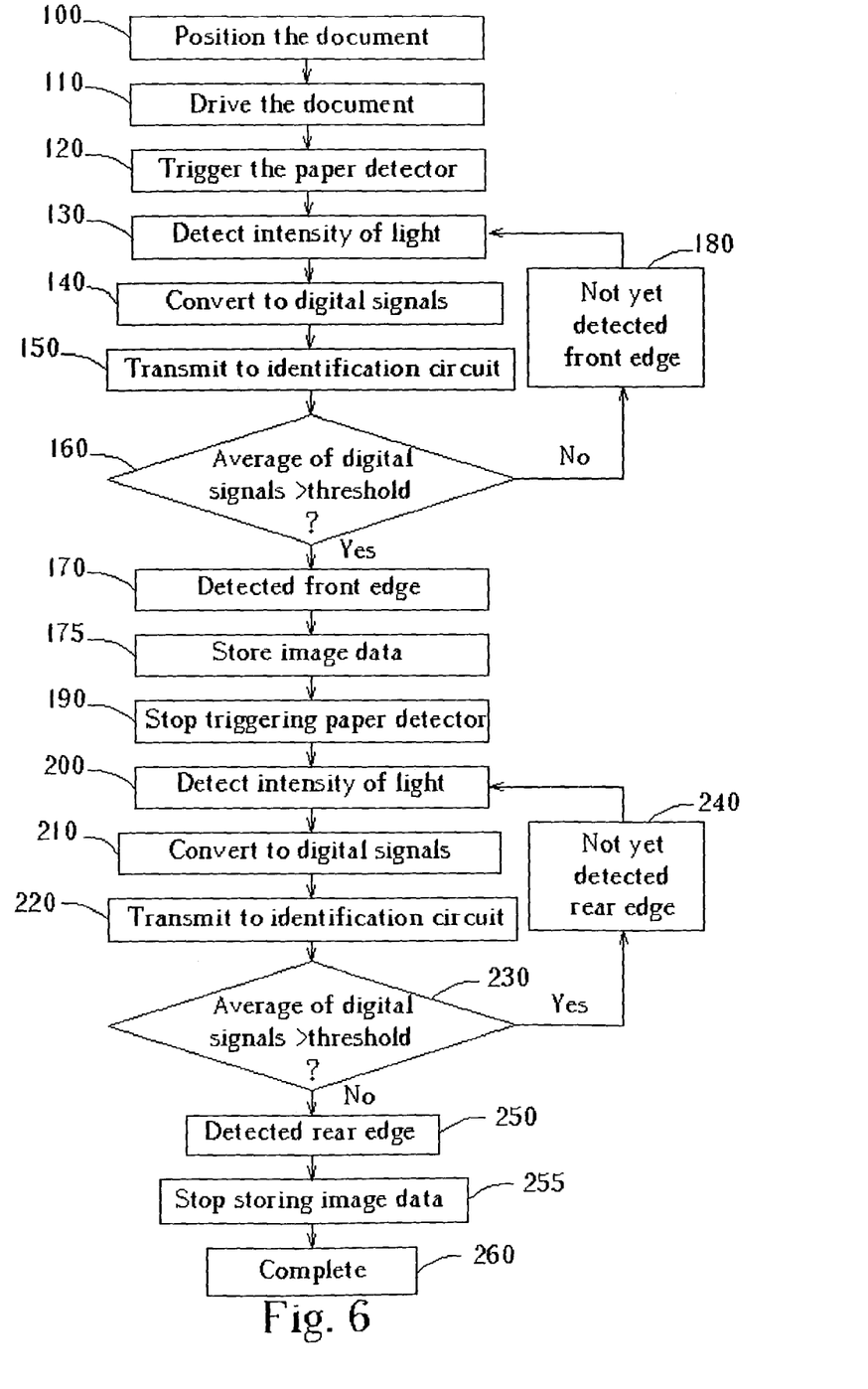
FIG. 6 is a flowchart according to the present invention.

Please refer to FIG. 6. FIG. 6 is a flowchart according to the present invention. It comprises the following steps:

Step 100: position the document 45 onto the paper tray 44 and instruct the scanner 40 to perform scanning;

Step 110: the step motor 48 rotates the roller 50 to drive the document 45 forward;

Step 120: when the document 45 triggers the paper detector 46, the scanning module 54 starts scanning immediately or after the step motor 48 moves a predetermined number of extra steps;

Step 130: use the photo sensors 56 of the scanning module 54 to detect intensities of light transmitted from each row of data, and transmit the intensities to the A/D converter 58;

Step 140: the A/D converter 58 converts the intensities to digital signals and passes the digital signals to the buffer 60;

Step 150: the buffer 60 transmits the digital signals to the identification circuit 62;

Step 160: the identification circuit 62 compares an average of the digital signals with a threshold; if the average is greater than the threshold, perform step 170; if the average is not greater than the threshold, perform step 180;

Step 170: the scanning module 54 has detected the front edge of the document 45;

Step 175: start to store image data collected by the scanning module 54 to the memory 64, go to step 190;

Step 180: the scanning module 54 has not detected the front edge of the document 45, go to step 130;

Step 190: when the rear edge of the document 45 passes the paper detector 46 so that the document 45 no longer triggers the paper detector 46, the processor 52 will use the identification circuit 62 to detect the rear edge of the document 45 immediately or after the step motor 48 moves a predetermined number of extra steps;

Step 200: use the photo sensors 56 of the scanning module 54 to detect intensities of light transmitted from each row of data, and transmit the intensities to the A/D converter 58;

Step 210: the A/D converter 58 converts the intensities to digital signals and passes the digital signals to the buffer 60;

Step 220: the buffer 60 transmits the digital signals to the identification circuit 62;

Step 230: the identification circuit 62 compares an average of the digital signals with a threshold; if the average is greater than the threshold, perform step 240; if the average is not greater than the threshold, perform step 250;

Step 240: the scanning module 54 has not detected the rear edge of the document 45, continue to store image data in the buffer 60 to the memory 64, go to step 200;

Step 250: the scanning module 54 has detected the rear edge of the document 45;

Step 255: stop storing image data in the buffer 60 to the memory 64;

Step 260: complete scanning the document 45.

The aforementioned paper detector 46 can be implemented by a microswitch or other detectors. Further, the above identification circuit 62 compares the average of light intensities with the threshold. However, the identification circuit 62 can first compares each intensity in a row of image data with the threshold, and then calculate the number of intensities in the row which are greater than the threshold. If the number is greater than a predetermined value, then the identification circuit 62 can identify that the scanning module 54 is scanning the document 45. If the number is not greater than the predetermined value, then the identification circuit 62 can identify that the scanning module 54 is not scanning the document 45. This method provides an alternative to achieve the goal of the present invention.

Compared to the prior art, the scanning module 54 begins scanning before the front edge of the document 45 crosses the scanning position and continues to scan until after the rear edge of the document 45 crosses the scanning position. The photo sensors 56 of the scanning module 54 are then used to detect the front and rear edges of the document 45 so that the image data beyond the front and rear edges of the document 45 will not be stored into the memory 64. At last, the processor 52 is used to process the image data stored in the memory 64 so as to remove image data beyond right and left edges of the document 45. In this way, the entire document 45 being scanned is captured in the document image, and extraneous blank areas are eliminated.

Those skilled in the art will readily observe that numerous modifications and alterations of the method may be made while retaining the teachings of the invention. Accordingly, the above disclosure should be construed as limited only by the metes and bounds of the appended claims.

The invention claimed is:

1. A method for acquiring document images with a paper feed scanner, the paper feed scanner comprising a scanning module for scanning a document at a scanning position, a motor for driving the document, and a memory for storing image data, the method comprising the steps of:
   (a) turning the motor to feed the document toward a scanning position;
   (b) the scanning module starting scanning before the document reaches the scanning position;
   (c) detecting an edge of the document according to an image generated by the scanning module, and starting or stopping storing image data generated by the scanning module into the memory when detecting the edge of the document.

2. The method of claim 1 wherein when detecting a front edge of the document, image data generated by the scanning module is started to be stored into the memory.

3. The method of claim 1 wherein when detecting a rear edge of the document, image data generated by the scanning module is stopped to be stored into the memory.

4. The method of claim 1 wherein the scanning module comprises a plurality of photo sensors for detecting light transmitted from the document, an A/D converter connected to the plurality of the photo sensors for converting analog signals transmitted from the photo sensors into digital signals, and an identification circuit connected to the A/D converter for comparing the digital signals with a threshold to detect the edge of the document.

5. The method of claim 1 wherein the scanning module comprises a plurality of photo sensors for detecting light transmitted from the document, an A/D converter connected to the plurality of the photo sensors for converting analog signals transmitted from the photo sensors into digital signals, and an identification circuit connected to the A/D converter for comparing an average of the digital signals with a threshold to detect the edge of the document.

6. The method of claim 1 wherein the paper feed scanner further comprises a processor for processing the image generated by the scanning module, the method further comprising after completing scanning, the processor detecting left and right edges of the document in the generated image and removing images beyond the left and right edges of the document.

7. The method of claim 1 wherein the scanner further comprises a paper detector for detecting the document fed into the scanner.

8. The method of claim 7 wherein the paper detector is a microswitch which is triggered by a document.

9. The method of claim 7 wherein the paper detector is a light sensor.

10. The method of claim 1 wherein the motor is a step motor.

\* \* \* \* \*